United States Patent
Yoshida et al.

(10) Patent No.: US 8,598,241 B2
(45) Date of Patent: Dec. 3, 2013

(54) POLYPROPYLENE RESIN PRE-FOAMED PARTICLE AND METHOD FOR PRODUCING SAME, AND POLYPROPYLENE RESIN IN-MOLD FOAMING MOLDED ARTICLE

(75) Inventors: Toru Yoshida, Osaka (JP); Hiroshi Tsuneishi, Osaka (JP)

(73) Assignee: Kaneka Corporation, Osaka (JP)

( * ) Notice: Subject to any disclaimer, the term of this patent is extended or adjusted under 35 U.S.C. 154(b) by 227 days.

(21) Appl. No.: 13/146,333

(22) PCT Filed: Jan. 13, 2010

(86) PCT No.: PCT/JP2010/000127
§ 371 (c)(1),
(2), (4) Date: Jul. 26, 2011

(87) PCT Pub. No.: WO2010/087111
PCT Pub. Date: Aug. 5, 2010

(65) Prior Publication Data
US 2011/0281963 A1 Nov. 17, 2011

(30) Foreign Application Priority Data

Jan. 27, 2009 (JP) .............................. 2009-015538
Mar. 6, 2009 (JP) .............................. 2009-053807

(51) Int. Cl.
| | | |
|---|---|---|
| C08J 9/16 | (2006.01) |
| C08J 9/18 | (2006.01) |
| C08J 9/22 | (2006.01) |
| C08J 9/00 | (2006.01) |
| B29C 44/44 | (2006.01) |
| C08F 210/00 | (2006.01) |
| C08F 4/44 | (2006.01) |
| C08F 110/00 | (2006.01) |

(52) U.S. Cl.
USPC ............. 521/60; 521/56; 521/59; 521/134; 521/142; 521/143; 526/160; 526/170; 526/348; 526/351; 526/943

(58) Field of Classification Search
USPC ........ 521/56, 59, 60, 134, 142, 143; 526/348, 526/170, 351, 160, 943
See application file for complete search history.

(56) References Cited

U.S. PATENT DOCUMENTS

| | | | |
|---|---|---|---|
| 5,468,781 A | 11/1995 | Sugano et al. | |
| 6,313,184 B1 | 11/2001 | Sasaki et al. | |
| 6,432,860 B1 | 8/2002 | Shamshoum et al. | |
| 6,451,419 B1 | 9/2002 | Tsurugai et al. | |
| 6,593,382 B2 * | 7/2003 | Kiguchi et al. | 521/58 |
| 6,939,928 B1 * | 9/2005 | Kawai et al. | 526/160 |
| 7,300,960 B2 * | 11/2007 | Wada | 521/56 |
| 7,402,638 B2 | 7/2008 | Matsumura et al. | |
| 7,449,533 B2 | 11/2008 | Kawai et al. | |
| 2005/0113473 A1 | 5/2005 | Wada | |
| 2005/0228155 A1 | 10/2005 | Kawai et al. | |
| 2006/0222849 A1 * | 10/2006 | Matsumura et al. | 428/407 |
| 2007/0208140 A1 | 9/2007 | Wada | |
| 2009/0156700 A1 | 6/2009 | Oikawa et al. | |
| 2010/0105787 A1 | 4/2010 | Sasaki et al. | |
| 2010/0137466 A1 | 6/2010 | Sasaki et al. | |
| 2012/0029101 A1 | 2/2012 | Senda | |

FOREIGN PATENT DOCUMENTS

| | | |
|---|---|---|
| EP | 1 036 814 A1 | 9/2000 |
| EP | 2221337 A1 | 8/2010 |
| EP | 2487199 A1 | 8/2012 |
| JP | 6-240041 A | 8/1994 |
| JP | 2004-143451 A | 5/2004 |
| JP | 2005-200450 A | 7/2005 |
| JP | 2006-022138 A | 1/2006 |
| JP | 2006-57010 A | 3/2006 |
| JP | 2006-096805 A | 4/2006 |
| JP | 2009-144096 A | 7/2009 |
| WO | 98/06777 A1 | 2/1998 |
| WO | 99/28374 A1 | 6/1999 |
| WO | 01/27124 A1 | 4/2001 |
| WO | 2008/139822 A1 | 11/2008 |
| WO | 2009/001626 A1 | 12/2008 |
| WO | 2010/113471 A1 | 10/2010 |

OTHER PUBLICATIONS

Notification of Transmittal of Translation of the International Preliminary Report on Patentability (Form PCT/IB/338) of International Application No. PCT/JP2007/000127 mailed Aug. 18, 2011 with Forms PCT/IB/373 and PCT/ISA/237.
International Search Report for PCT/JP2010/000127, mailing date of Mar. 23, 2010.
Extended European Search Report dated Aug. 5, 2013, issued in corresponding European Patent Application No. 10735583.6 (6 pages).

* cited by examiner

*Primary Examiner* — Randy Gulakowski
*Assistant Examiner* — Kara Boyle
(74) *Attorney, Agent, or Firm* — Westerman, Hattori, Daniels & Adrian, LLP

(57) ABSTRACT

Provided are polypropylene resin pre-foamed particles including, as base resin, polypropylene resin that satisfies the following requirements (a) through (c): (a) in cross fractionation chromatography, an amount of components eluted at a temperature of not more than 40° C. is not more than 2.0% by weight; (b) a melting point is not less than 100° C. but not more than 160° C.; and (c) propylene monomer units are present in an amount of not less than 90 mol % but not more than 100 mol %, and olefin units each having a carbon number of 2 or 4 or more are present in an amount of not less than 0 mol % but not more than 10 mol %. The polypropylene resin pre-foamed particles can be molded by in-mold foaming molding at a not high molding heating steam pressure, and a polypropylene resin in-mold foaming molded product excellent in dimensional stability at high temperatures can be prepared from the polypropylene resin pre-foamed particles.

11 Claims, 1 Drawing Sheet

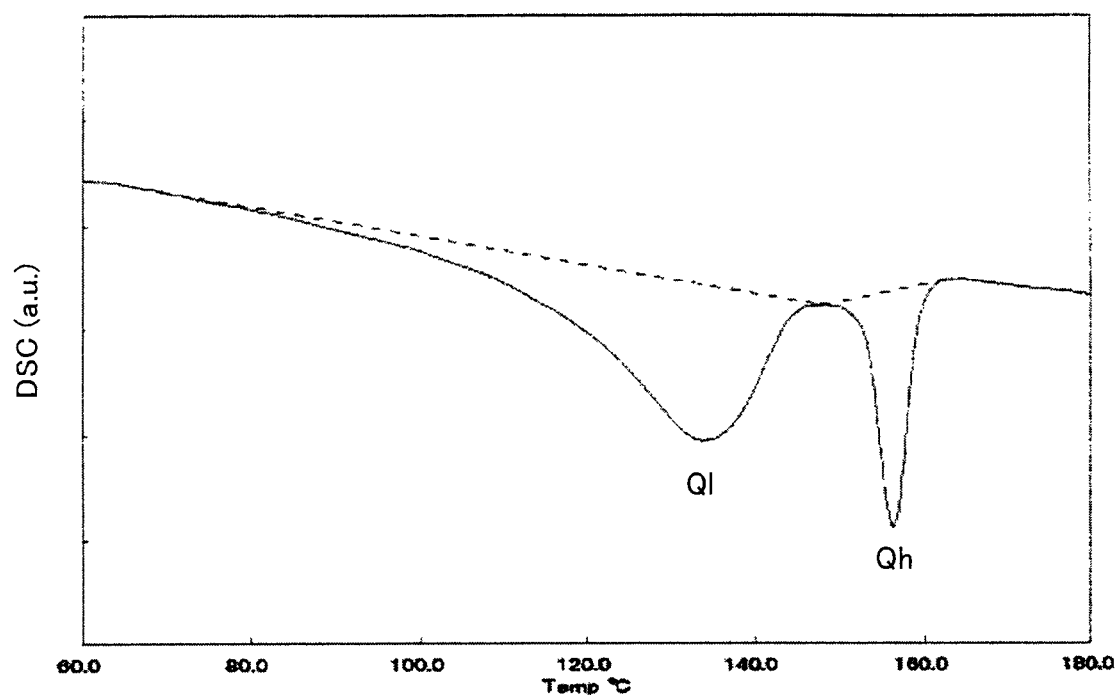

US 8,598,241 B2

POLYPROPYLENE RESIN PRE-FOAMED PARTICLE AND METHOD FOR PRODUCING SAME, AND POLYPROPYLENE RESIN IN-MOLD FOAMING MOLDED ARTICLE

TECHNICAL FIELD

The present invention relates to (i) polypropylene resin pre-foamed particles for use in an automobile interior part, a core material for an automobile bumper, a heat insulating material, a buffering packaging material, a returnable box, or the like, (ii) a method for producing polypropylene resin pre-foamed particles, and (iii) a polypropylene resin in-mold foaming molded product prepared from the polypropylene resin pre-foamed particles.

BACKGROUND ART

A polypropylene resin in-mold foaming molded product prepared from polypropylene resin pre-foamed particles is characterized by its freedom of shape, lightness, and heat insulation efficiency, which are advantages of an in-mold foaming molded product. Further, the polypropylene resin in-mold foaming molded product is superior to other similar in-mold foaming molded products. That is, the polypropylene resin in-mold foaming molded product is superior in (i) chemical resistance, heat resistance, and distortion recovery rate after compression to an in-mold foaming molded product prepared from polystyrene resin pre-foamed particles and (ii) dimensional accuracy, heat resistance, and compression strength to an in-mold foaming molded product prepared from polyethylene resin pre-foamed particles. Because of these characteristics, the polypropylene resin in-mold foaming molded product prepared from the polypropylene resin pre-foamed particles has been used for various applications for example for an automobile interior part and a core material for an automobile bumper, as well as a heat insulating material and a buffering packaging material.

The polypropylene resin in-mold foaming molded product prepared from the polypropylene resin pre-foamed particles is required to have an important property such as dimensional stability at high temperatures.

The polypropylene resin in-mold foaming molded product is often used in a high-temperature atmosphere. For example, an automobile interior part may be locally subjected to a temperature of almost 100° C. when used during the summer inside a car with its windows closed. Further, a heat insulating material, a buffering packaging material, a returnable box etc. are also often used in a high-temperature environment.

In view of this, the polypropylene resin in-mold foaming molded product is required to express excellent dimensional stability even in a high-temperature atmosphere. To this end, generally, a polypropylene resin in-mold foaming molded product prepared from polypropylene resin having a high melting point is employed.

However, use of such polypropylene resin having a high melting point causes the following problem. That is, the high melting point necessitates a high molding heating steam pressure when pre-foamed particles made from the polypropylene resin are subjected to in-mold foaming molding. This leads to an increase in molding process cost.

Therefore, a polypropylene resin in-mold foaming molded product that (i) can be molded by in-mold foaming molding at a low molding heating steam pressure and (ii) is excellent in dimensional stability at high temperatures has been desired.

Meanwhile, in recent years, a technique of catalysis of polymerization of polypropylene resin has been widely studied, and various studies are to be carried out to improve properties of polypropylene resin. Under the circumstances, there has been obtained polypropylene resin having a composition distribution sharper than that of conventional polypropylene resin (for example, Patent Literature 1). The polypropylene resin having the sharp composition distribution is achieved by controlling the composition distribution by using a so-called metallocene catalyst.

Further, there have been known pre-foamed particles made from polypropylene resin using a metallocene catalyst (for example, Patent Literatures 2 through 7).

CITATION LIST

Patent Literatures

Patent Literature 1
Japanese Patent Application Publication, Tokukai, No. 2006-57010 A
Patent Literature 2
Japanese Patent Application Publication, Tokukaihei, No. 6-240041 A
Patent Literature 3
PCT International Publication No. WO1999/028374 A1
Patent Literature 4
Japanese Patent Application Publication, Tokukai, No. 2004-143451 A
Patent Literature 5
PCT International Publication No. WO2008/139822 A1
Patent Literature 6
PCT International Publication No. WO2009/001626 A1
Patent Literature 7
Japanese Patent Application Publication, Tokukai, No. 2009-144096 A

SUMMARY OF INVENTION

Technical Problem

Development has been desired for polypropylene resin pre-foamed particles (i) which do not necessitate a high molding heating steam pressure when molded by in-mold foaming molding and (ii) from which it is possible to prepare a polypropylene resin in-mold foaming molded product excellent in dimensional stability at high temperatures.

Solution to Problem

The inventors of the present invention diligently worked in view of the foregoing problem, and found that, by using polypropylene resin having a specific characteristic as base resin, it is possible to obtain, with good production efficiency, polypropylene resin pre-foamed particles (i) which do not necessitate a high molding heating steam pressure when molded by in-mold foaming molding and (ii) from which it is possible to prepare a polypropylene resin in-mold foaming molded product excellent in dimensional stability at high temperatures. As a result, the inventors have completed the present invention.

That is, the present invention is as follows:
[1] Polypropylene resin pre-foamed particles including, as base resin, polypropylene resin that satisfies the following requirements (a) through (c):
(a) in cross fractionation chromatography, an amount of components eluted at a temperature of not more than 40° C. is not more than 2.0% by weight;

(b) a melting point is not less than 100° C. but not more than 160° C.; and (c) propylene monomer units are present in an amount of not less than 90 mol % but not more than 100 mol %, and olefin units each having a carbon number of 2 or 4 or more are present in an amount of not less than 0 mol % but not more than 10 mol %.

[2] The polypropylene resin pre-foamed particles according to [1], wherein, in the polypropylene resin, the amount of components eluted at the temperature of not more than 40° C. in cross fractionation chromatography is not more than 0.5% by weight.

[3] The polypropylene resin pre-foamed particles according to [1] or [2], wherein the polypropylene resin has been polymerized by using a metallocene catalyst.

[4] The polypropylene resin foamed particles according to [3], wherein the metallocene catalyst contains a metallocene compound having a structure in which transition metal is sandwiched between different types of pi unsaturated cyclic compounds.

[5] The polypropylene resin foamed particles according to [3] or [4], wherein the metallocene catalyst contains a metallocene compound represented by a general formula [I]:

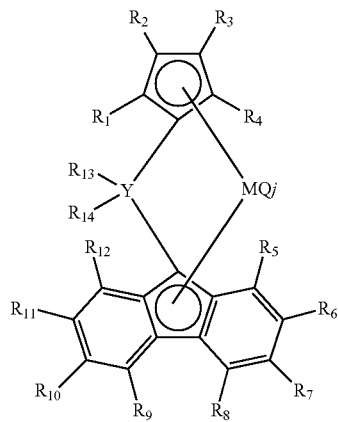

In the general formula [I], $R^1, R^2, R^3, R^4, R^5, R^6, R^7, R^8, R^9, R^{10}, R^{11}, R^{12}, R^{13}$, and $R^{14}$ are identical with each other or are different from each other and are each selected from a hydrogen atom, a hydrocarbon group, and a silicon-containing group; M represents group-4 transition metal; Y represents a carbon atom or a silicon atom; Qs are identical with each other or are different from each other and are each selected from a halogen atom, a hydrocarbon group, an anion ligand, and a neutral ligand capable of coordination by a lone pair of electrons; and j is an integer of 1 to 4.

[6] The polypropylene resin pre-foamed particles according to any one of [1] through [5], wherein the melting point of the polypropylene resin is not less than 110° C. but not more than 145° C.

[7] The polypropylene resin pre-foamed particles according to any one of [1] through [6], wherein, in the polypropylene resin, a total amount of regio-irregular propylene monomer units based on 2,1-insertion and 1,3-insertion relative to overall propylene insertion as determined by $^{13}$C-NMR is less than 0.5 mol %.

[8] Polypropylene resin pre-foamed particles according to any one of [1] through [7], further including a phenolic antioxidant in an amount of not less than 0.005 parts by weight but not more than 0.5 parts by weight to 100 parts by weight of the polypropylene resin.

[9] The polypropylene resin pre-foamed particles according to any one of [1] through [8], wherein: two melting peaks, which are a first melting peak on a lower-temperature side and a second melting peak on a higher-temperature side, are observed in differential scanning calorimetry; and a ratio Qh/(Ql+Qh)×100 of the second melting peak is not less than 10% but not more than 50%, the ratio being calculated from quantity of heat Ql at the first melting peak and quantity of heat Qh at the second melting peak.

[10] A polypropylene resin in-mold foaming molded product prepared from polypropylene resin pre-foamed particles recited in any one of [1] through [9], the polypropylene resin in-mold foaming molded product having a density of not less than 10 kg/m³ but not more than 300 kg/m³.

[11] A method for producing polypropylene resin pre-foamed particles, including the steps of: introducing polypropylene resin particles satisfying the following requirements (a) through (c), water, and an inorganic dispersant into a pressure-resistant container; dispersing the polypropylene resin particles while stirring; raising a temperature of a dispersion liquid to a temperature higher or equal to a softening point of the polypropylene resin particles under existence of a foaming agent; and releasing the dispersion liquid from the pressure-resistant container into a zone whose pressure is lower than an internal pressure of the pressure-resistant container so as to foam the polypropylene resin particles:

(a) in cross fractionation chromatography, an amount of components eluted at a temperature of not more than 40° C. is not more than 2.0% by weight;

(b) a melting point is not less than 100° C. but not more than 160° C.; and (c) propylene monomer units are present in an amount of not less than 90 mol % but not more than 100 mol %, and olefin units each having a carbon number of 2 or 4 or more are present in an amount of not less than 0 mol % but not more than 10 mol %.

Advantageous Effects of Invention

According to the present invention, polypropylene resin particles are hardly united closely to each other during production of polypropylene resin pre-foamed particles. Therefore, it is possible to obtain polypropylene resin pre-foamed particles with excellent production efficiency. Further, with use of the polypropylene resin pre-foamed particles thus obtained, it is possible to produce, at a low molding heating steam pressure, a polypropylene resin in-mold foaming molded product excellent in dimensional stability at high temperatures.

BRIEF DESCRIPTION OF DRAWINGS

FIG. 1 illustrates an example of a DSC curve obtained when polypropylene resin pre-foamed particles described in the present invention are measured with use of a differential scanning calorimeter. A horizontal axis indicates a temperature, whereas a vertical axis indicates quantity of heat absorption. Ql is a region enclosed by a dotted line and a peak on a lower-temperature side, whereas Qh is a region enclosed by a dotted line and a peak on a higher-temperature side.

DESCRIPTION OF EMBODIMENTS

Polypropylene resin pre-foamed particles in accordance with the present invention are polypropylene resin pre-foamed particles including, as base resin, polypropylene resin that satisfies the following requirements (a) through (c):

(a) in cross fractionation chromatography, an amount of components eluted at a temperature of not more than 40° C. is not more than 2.0% by weight;

(b) a melting point is not less than 100° C. but not more than 160° C.; and (c) propylene monomer units are present in an amount of not less than 90 mol % but not more than 100 mol %, and olefin units each having a carbon number of 2 or 4 or more are present in an amount of not less than 0 mol % but not more than 10 mol %.

In the polypropylene resin used in the present invention, in cross fractionation chromatography, the amount of components eluted at the temperature of not more than 40° C. is not more than 2.0% by weight, preferably not more than 1.0% by weight, more preferably not more than 0.7% by weight, and most preferably not more than 0.5% by weight. If the amount of components eluted at the temperature of not more than 40° C. in cross fractionation chromatography is more than 2.0% by weight, then a polypropylene resin in-mold foaming molded product prepared from the polypropylene resin will have reduced dimensional stability at high temperatures.

In a case where the amount of components eluted at the temperature of not more than 40° C. in cross fractionation chromatography is not more than 2.0% by weight, (i) the polypropylene resin should have a sharp resin composition distribution and (ii) a ratio of a composition that causes a reduction in dimensional stability at high temperatures should decrease. This makes it possible to form a polypropylene resin in-mold foaming molded product without raising a melting point of the polypropylene resin that is used. That is, it is possible to form a polypropylene resin in-mold foaming molded product at a low molding heating steam pressure. In addition, a polypropylene resin in-mold foaming molded product prepared from such polypropylene resin should have improved dimensional stability at high temperatures.

Such polypropylene resin, in which the amount of components eluted at the temperature of not more than 40° C. in cross fractionation chromatography is not more than 2.0% by weight, can be obtained by controlling as appropriate a polymerization condition when polymerized. It is particularly important to select a polymerization catalyst. As will be described, the polymerization catalyst to be used is preferably a metallocene catalyst. However, even with use of the metallocene catalyst, polypropylene resin to be obtained may be the one in which an amount of components eluted at a temperature of not more than 40° C. in cross fractionation chromatography is more than 2.0% by weight. Such polypropylene resin, in which the amount of components eluted at the temperature of not more than 40° C. in cross fractionation chromatography is more than 2.0% by weight even with use of the metallocene catalyst, is obtained for example in a case of Comparative Example 4 or 5 of Japanese Patent Application Publication, Tokukai, No. 2006-57010 A. Even in a case where the amount of components eluted at the temperature of not more than 40° C. in cross fractionation chromatography is more than 2.0% by weight for resin alone, it may be possible to attain the amount of components eluted at the temperature of not more than 40° C. in cross fractionation chromatography of not more than 2.0% by weight by mixing other resin.

Note here that, the cross fractionation chromatography for the polypropylene resin used in the present invention can be carried out under the following condition. Further, note that the amount of components eluted at the temperature of not more than 40° C. is integral of an amount of components eluted at a temperature of not more than 40° C.

Apparatus: Cross Fractionation Chromatograph, Model CFC T-150A, manufactured by Mitsubishi Petrochemical Co., Ltd.
Detector: Infrared Spectrophotometer, Model 1ACVF, manufactured by Miran
Detection wavelength: 3.42 μm
GPC column: Three columns, each of which is Shodex AT-806MS, manufactured by SHOWA DENKO K.K.
Column temperature: 135° C.
Column calibration: Monodisperse polystyrene, manufactured by TOSOH CORPORATION
Molecular weight calibration method: General calibration method/based on polyethylene
Eluent: o-dichlorobenzene (ODCB)
Flow rate: 1.0 mL/min
Sample concentration: 30 mg/10 mL
Injection amount: 500 μL
Temperature-lowering period: 135 minutes (0° C. from 135), temperature is maintained for next 60 minutes
Elution fraction: 0° C., 20° C., 40° C., 50° C., 60° C., 70° C., 75° C., 80° C., 83° C., 86° C., 89° C., 92° C., 95° C., 98° C., 101° C., 104° C., 106° C., 108° C., 110° C., 112° C., 114° C., 116° C., 118° C., 120° C., 122° C., 124° C., 126° C., 130° C., 135° C. (29 fractions)

The polypropylene resin used in the present invention has a melting point of not less than 100° C. but not more than 160° C., preferably not less than 110° C. but not more than 145° C., and most preferably not less than 115° C. but not more than 140° C. If the melting point is less than 100° C., then a polypropylene resin in-mold foaming molded product prepared from the polypropylene resin will have reduced dimensional stability at high temperatures. If the melting point is more than 160° C., then a higher molding heating steam pressure is necessary for the in-mold foaming molding.

Note here that, in the present invention, the term "melting point" means a peak temperature of an endothermic peak on a DSC curve that is obtained by, by using a differential scanning calorimeter, raising a temperature of not less than 1 mg but not more than 10 mg of polypropylene resin from 40° C. to 220° C. at a heating rate of 10° C./min, lowering the temperature to 40° C. at a cooling rate of 10° C./min, and then again raising the temperature to 220° C. at a heating rate of 10° C./min.

In the polypropylene resin used in the present invention, propylene monomer units are present in an amount of not less than 90 mol % but not less than 100 mol %, and olefin units each having a carbon number of 2 or 4 or more are present in an amount of not less than 0 mol % but not more than 10 mol %. Preferably, the propylene monomer units are present in an amount of not less than 92 mol % but not more than 100 mol % and the olefin units each having a carbon number of 2 or 4 or more are present in an amount of not less than 0 mol % but not more than 8 mol %. More preferably, the propylene monomer units are present in an amount of not less than 94 mol % but not more than 100 mol % and the olefin units each having a carbon number of 2 or 4 or more are present in an amount of not less than 0 mol % but not more than 6 mol %. Most preferably, the propylene monomer units are present in an amount of not less than 96 mol % but not more than 100 mol % and the olefin units each having a carbon number of 2 or 4 or more are present in an amount of not less than 0 mol % but not more than 4 mol %.

If the amount of the propylene monomer units is less than 90 mol % and the amount of the olefin units each having a carbon number of 2 or 4 or more is more than 10 mol %, then a polypropylene resin in-mold foaming molded product prepared from the polypropylene resin will have reduced dimensional stability at high temperatures.

The olefin, of the present invention, which has a carbon number of 2 or 4 or more is not particularly limited. Specific examples of the olefin encompass: alpha olefin such as ethylene, 1-butene, isobutene, 1-pentene, 3-methyl-1-butene, 1-hexene, 4-methyl-1-pentene, 3,4-dimethyl-1-butene, 1-heptene, 3-methyl-1-hexene, 1-octene, and 1-decene. Examples of the olefin further encompass: cyclic olefin such as cyclopentene, norbornene, and tetracyclo[6,2,1$^{1,8}$,1$^{3,6}$]-4-dodecene; diene such as 5-methylene-2-norbornene, 5-ethylidene-2-norbornene, 1,4-hexadiene, methyl-1,4-hexadiene, and 7-methyl-1,6-octadiene.

Out of these, it is more preferable that the olefin having a carbon number of 2 or 4 or more be ethylene or alpha olefin, and most preferable that the olefin be ethylene or 1-butene. The olefin having a carbon number of 2 or 4 or more can be used alone or in combination of two or more types.

The polypropylene resin of the present invention can be further copolymerized with vinyl monomers such as vinyl chloride, vinylidene chloride, acrylonitrile, vinyl acetate, acrylic acid, methacrylic acid, maleic acid, ethyl acrylate, butyl acrylate, methyl methacrylate, maleic anhydride, styrene, methylstyrene, vinyltoluene, divinylbenzene, or the like.

Out of these types of polypropylene resin, a propylene-ethylene random copolymer, a propylene-ethylene-1-butene random copolymer, and a propylene-1-butene random copolymer prepared from ethylene and/or 1-butene exhibit good foamability, and are suitably usable also in view of improvement in resistance to cold brittleness and a cost reduction.

A catalyst to be used for polymerization of the polypropylene resin of the present invention is not particularly limited, and is for example a Ziegler-Natta catalyst or a metallocene catalyst. It is preferable that the catalyst be a metallocene catalyst, because it makes it easy to obtain the polypropylene resin in which the amount of components eluted at the temperature of not more than 40° C. in cross fractionation chromatography is not more than 2.0% by weight.

Such a metallocene catalyst is for example (1) a metallocene catalyst containing a metallocene compound having a structure in which transition metal is sandwiched between pi unsaturated cyclic compounds, (2) a metallocene catalyst containing a metallocene compound having only one pi unsaturated cyclic compound, (3) a metallocene catalyst containing a metallocene compound which has no pi unsaturated cyclic compound and in which a hetero atom is coordinated, or the like.

Out of these, it is more preferable that the metallocene catalyst be the metallocene catalyst (1), i.e., the metallocene catalyst containing the metallocene compound having the structure in which transition metal is sandwiched between the pi unsaturated cyclic compounds. Specific examples of a metallocene compound for use in such a metallocene catalyst, which compound has a structure in which transition metal is sandwiched between pi unsaturated cyclic compounds, encompass: ethylenebis(2-methylindenyl)zirconiumdichloride, ethylenebis(2-methyl-4,5,6,7-tetrahydroindenyl)zirconiumdichloride, ethylenebis(2,4-dimethylindenyl)zirconiumdichloride, ethylenebis(4,5,6,7-tetrahydroindenyl)hafniumdichloride, dimethylsilylenebis(4,5,6,7-tetrahydroindenyl)zirconiumdichloride, dimethylsilylenebis(2-methylindenyl)zirconiumdichloride, dimethylsilylenebis(2-methyl-4,5,6,7-tetrahydroindenyl)zirconiumdichloride, dimethylsilylenebis(2,4-dimethylindenyl)zirconiumdichloride, methylenebis{1,1'-(2-methyl-4-phenyldihydroazulenyl)}zirconiumdichloride, methylenebis{1,1'-(2-ethyl-4-phenyldihydroazulenyl)}zirconiumdichloride, methylenebis{1,1'-(4-phenyldihydroazulenyl)}zirconiumdichloride, methylenebis{1,1'-(4-naphthyldihydroazulenyl)}zirconiumdichloride, ethylenebis{1,1'-(2-methyl-4-phenyldihydroazulenyl)}zirconiumdichloride, ethylenebis{1,1'-(2-ethyl-4-phenyldihydroazulenyl)}zirconiumdichloride, ethylenebis{1,1'-(4-phenyldihydroazulenyl)}zirconiumdichloride, ethylenebis{1,1'-(4-naphthyldihydroazulenyl)}irconiumdichloride, isopropylidenebis{1,1'-(2-methyl-4-phenyldihydroazulenyl)}zirconiumdichloride, isopropylidenebis{1,1'-(2-ethyl-4-phenyldihydroazulenyl)}zirconiumdichloride, isopropylidenebis{1,1'-(4-phenyldihydroazulenyl)}zirconiumdichloride, isopropylidenebis{1,1'-(4-naphthyldihydroazulenyl)}zirconiumdichloride, dimethylsilylenebis{1,1'-(2-methyl-4-phenyldihydroazulenyl)}zirconiumdichloride, dimethylsilylenebis{1,1'-(2-ethyl-4-phenyldihydroazulenyl)}zirconiumdichloride, dimethylsilylenebis{1,1'-(4-phenyldihydroazulenyl)}zirconiumdichloride, dimethylsilylenebis{1,1'-(4-naphthyldihydroazulenyl)}zirconiumdichloride, diphenylsilylenebis{1,1'-(2-methyl-4-phenyldihydroazulenyl)}zirconiumdichloride, diphenylsilylenebis{1,1'-(2-ethyl-4-phenyldihydroazulenyl)} zirconiumdichloride, diphenylsilylenebis{1,1'-(4-phenyldihydroazulenyl)}zirconiumdichloride, diphenylsilylenebis{1,1'-(4-naphthyldihydroazulenyl)} zirconiumdichloride, and the like.

Out of these types of the metallocene catalyst (1), in particular, it is more preferable that the metallocene catalyst be a metallocene catalyst containing a metallocene compound having a structure in which transition metal is sandwiched between different types of pi unsaturated cyclic compounds. An example of such a metallocene compound having a structure in which transition metal is sandwiched between different types of pi unsaturated cyclic compounds encompasses a metallocene compound obtained by selecting, as pi unsaturated cyclic compounds, two or more types of pi unsaturated cyclic compounds from a compound having a cyclopentadienyl structure, a compound having an indenyl structure, a compound having an azulenyl structure, a compound having a fluorenyl structure, and the like.

Out of these, a most preferable metallocene catalyst is a metallocene catalyst essentially containing a metallocene compound represented by the following general formula [I]:

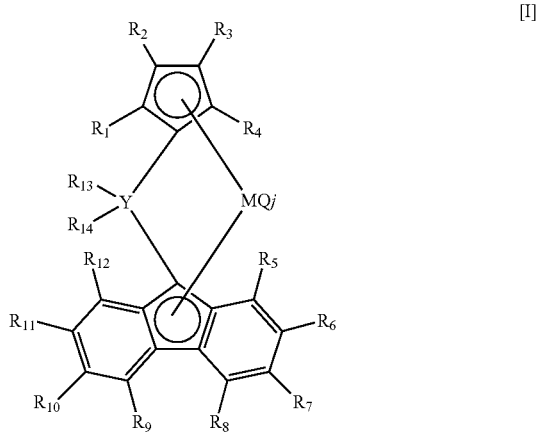

In the general formula [I], $R_1$, $R_2$, $R_3$, $R_4$, $R_5$, $R_6$, $R_7$, $R_8$, $R_9$, $R_{10}$, $R_{11}$, $R_{12}$, $R_{13}$, and $R_{14}$ are identical with each other or are different from each other and are each selected from a hydrogen atom, a hydrocarbon group, and a silicon-containing group; M represents group-4 transition metal; Y represents a carbon atom or a silicon atom; Qs are identical with each other or are different from each other and are each selected from a halogen atom, a hydrocarbon group, an anion ligand, and a neutral ligand capable of coordination by a lone pair of electrons; and j is an integer of 1 to 4.

Specific examples of the metallocene compound represented by the general formula [I] encompass: isopropylidene(3-tert-butyl-5-methyl-cyclopentadienyl)(fluorenyl)zirconiumdichloride, isopropylidene(3-tert-butyl-5-methyl-cyclopentadienyl)(3,6-ditert-butylfluorenyl)zirconiumdichloride, diphenylmethylene(3-tert-butyl-5-methyl-cyclopentadienyl)(fluorenyl)zirconiumdichloride, diphenylmethylene(3-tert-butyl-5-methyl-cyclopentadienyl)(2,7-ditert-butylfluorenyl)zirconiumdichloride, diphenylmethylene(3-tert-butyl-5-methyl-cyclopentadienyl)(3,6-di-tert-butylfluorenyl)zirconiumdichloride, and the like.

In the polypropylene resin used in the present invention, it is preferable that a total amount of regio-irregular propylene monomer units based on 2,1-insertion and 1,3-insertion relative to overall propylene insertion as determined by $^{13}$C-NMR is less than 0.5 mol %. Since such polypropylene resin tends to have a small amount of low-crystallinity components, it is possible to prepare, from the polypropylene resin, polypropylene resin pre-foamed particles that are not closely united to each other and are excellent in production efficiency. Further, a polypropylene resin in-mold foaming molded product prepared from the polypropylene resin pre-foamed particles is estimated to have further improved dimensional stability at high temperatures.

Note here that, for such polypropylene resin, an amount of regio-irregular propylene monomer units based on 2,1-insertion and 1,3-insertion relative to overall propylene insertion as determined by $^{13}$C-NMR can be calculated with reference to information disclosed in *Polymer*, 30, 1350 (1989) or Japanese Patent Application Publication, Tokukaihei, No. 7-145212 A.

The polypropylene resin of the present invention is not particularly limited as to its melt flow rate (MFR). Note, however, that the melt flow rate is preferably not less than 0.5 g/10 min but not more than 100 g/10 min, more preferably not less than 2 g/10 min but not more than 50 g/10 min, and most preferably not less than 3 g/10 min but not more than 20 g/10 min. In the present invention, an MFR is measured under a condition where (i) an MFR measuring instrument described in JIS-K7210 is used, (ii) an orifice is 2.0959±0.005 mm in diameter, (iii) the orifice is 8.000±0.025 mm in length, (iv) a load is 2160 g and (v) 230±0.2° C. In a case where the MFR falls within the above range, (a) it is easy to obtain polypropylene resin pre-foamed particles with a relatively high foaming ratio and (b) a polypropylene resin in-mold foaming molded product obtained by subjecting the polypropylene resin pre-foamed particles to in-mold foaming molding tends to have a beautiful surface and low rate of dimensional shrinkage.

The foregoing types of polypropylene resin are preferably not cross-linked. However, the polypropylene resin can be cross-linked with use of peroxide or radiation. Further, it is possible to use, together with the polypropylene resin, other thermoplastic resin that can be used together with the polypropylene resin, as long as such thermoplastic resin does not impair properties of the polypropylene resin of the present invention. Such thermoplastic resin is for example polypropylene resin other than the polypropylene resin of the present invention, low-density polyethylene, linear low-density polyethylene, polystyrene, polybutene, ionomer, or the like.

Generally, for the purpose of easy pre-foaming, the foregoing polypropylene resin is, in advance, (i) melted with use of an extruder, a kneader, a Banbury mixer, or a role etc. and (ii) processed and molded to be particles each having a desired shape such as a cylinder, an ellipse, a sphere, a cube, a rectangular parallelepiped, or the like. The particles thus obtained are polypropylene resin particles.

In the present invention, an additive can be added as appropriate to the polypropylene resin when polypropylene resin particles are prepared. Examples of the additive encompass antioxidants, light resistance improving agents, antistatic agents, pigments, flame resistance improving agents, conductivity improving agents, and the like. Generally, the additive is preferably added to molten resin during production of resin particles.

The additive to be used is preferably an antioxidant. Addition of the antioxidant makes it possible to cause the polypropylene resin in-mold foaming molded product, which is prepared from the polypropylene resin, to have more excellent dimensional stability at high temperatures.

Such an antioxidant is not particularly limited, and for example (i) a phenolic antioxidant, amine antioxidant, or sulphur antioxidant or (ii) a combination of any of the phenolic antioxidant, amine antioxidant, and sulphur antioxidant. It is more preferable that the antioxidant be a phenolic antioxidant, because it suppresses heat deterioration of the polypropylene resin.

Examples of the phenolic antioxidant encompass: 2,6-di-t-butyl-4-methylphenol (BHT), pentaerythrityl tetrakis[3-(3,5-di-t-butyl-4-hydroxyphenyl)propionate] (e.g., IRGANOX1010 manufactured by Chiba Japan Co., Ltd.), and 1,3,5-tris(3,5-di-t-butyl-4-hydroxybenzyl)isocyanurate (also known as 1,3,5-tris(3,5-di-t-butyl-4-hydroxybenzyl)-s-triazine-2,4,6(1H,3H,5H)-trione, e.g., IRGANOX3114 manufactured by Chiba Japan Co., Ltd.), 1,3,5-tris(2,6-dimethyl-3-hydroxy-4-t-butylbenzyl)isocyanurate (also known as 1,3,5-tris(4-t-butyl-3-hydroxy-2,6-dimethyl-benzyl)-s-triazine-2,4,6 (1H,3H,5H)-trione), 1,3,5-tris[(3,5-di-t-butyl-4-hydroxyphenyl)propionyloxyethyl]isocyanurate, and the like. Most preferable examples of the phenolic antioxidant encompass: pentaerythrityl tetrakis[3-(3,5-di-t-butyl-4-hydroxyphenyl)propionate] (e.g., IRGANOX1010 manufactured by Chiba Japan Co., Ltd.), 1,3,5-tris(3,5-di-t-butyl-4-hydroxybenzyl)isocyanurate (also known as 1,3,5-tris(3,5-di-t-butyl-4-hydroxybenzyl)-s-triazine 2,4,6(1H,3H,5H)-trione, e.g., IRGANOX3114 manufactured by Chiba Japan Co., Ltd.

An amount of the phenolic antioxidant to be added is controlled as appropriate so that (i) an antioxidizing property and (ii) dimensional stability at high temperatures of the polypropylene resin in-mold foaming molded product are expressed. The amount of the phenolic antioxidant to be added is preferably not less than 0.005 parts by weight but not more than 0.5 parts by weight, more preferably not less than 0.01 parts by weight but not more than 0.4 parts by weight, and most preferably not less than 0.03 parts by weight but not more than 0.3 parts by weight, to 100 parts by weight of the polypropylene resin. If the amount is less than 0.005 parts by weight, then (i) the antioxidizing property and (ii) dimensional stability at high temperatures of the polypropylene resin in-mold foaming molded product are less expressed. On the other hand, more than 0.5 parts by weight of the phenolic antioxidant tends to cause cells to be extremely small and thus cause a reduction in moldability during in-mold foaming molding.

The polypropylene resin pre-foamed particles of the present invention are produced by (i) introducing, into a pressure-resistant container, a dispersion liquid containing polypropylene resin particles satisfying the following requirements (a) through (c), water, and an inorganic dispersant, (ii) dispersing the polypropylene resin particles while stirring, (iii) raising a temperature of the dispersion liquid to a temperature higher or equal to a softening point of the polypropylene resin particles under existence of a foaming agent, and (iv) releasing the dispersion liquid from the pressure-resistant container into a zone whose pressure is lower than an internal pressure of the pressure-resistant container so as to foam the polypropylene resin particles:

(a) in cross fractionation chromatography, an amount of components eluted at a temperature of not more than 40° C. is not more than 2.0% by weight;
(b) a melting point is not less than 100° C. but not more than 160° C.; and
(c) propylene monomer units are present in an amount of not less than 90 mol % but not more than 100 mol %, and olefin units each having a carbon number of 2 or 4 or more are present in an amount of not less than 0 mol % but not more than 10 mol %.

Note here that, the temperature higher than or equal to the softening point is preferably a temperature of not less than 20° C. below a melting point of the polypropylene resin particles but not more than 10° C. above the melting point of the polypropylene resin particles, because this makes it possible to secure foamability.

Examples of the foaming agent used in the present invention encompass: aliphatic hydrocarbons such as propane, normal butane, isobutane, normal pentane, isopentane, and hexane; aliphatic cyclized hydrocarbons such as cyclopentane and cyclobutane; inorganic gasses such as air, nitrogen, and carbon dioxide gas; and water. The foaming agent can be used alone, or two or more types of the foaming agents can be used in combination. Out of these, it is preferable to use carbon dioxide gas, water, or isobutane that attains high foaming ratio.

An amount of the foaming agent to be added is not limited, and therefore can be determined as appropriate according to a desired foaming ratio of the polypropylene resin pre-foamed particles. The amount is preferably not less than 3 parts by weight but not more than 60 parts by weight to 100 parts by weight of the polypropylene resin particles.

The pressure-resistant container used in production of the polypropylene resin pre-foamed particles is not particularly limited, as long as it can withstand pressure and temperature inside the container during the production of the polypropylene resin pre-foamed particles. The pressure-resistant container is for example an autoclave-type pressure-resistant container.

Examples of an inorganic dispersant that can be used in the present invention encompass tertiary calcium phosphate, tertiary magnesium phosphate, basic magnesium carbonate, calcium carbonate, basic zinc carbonate, aluminum oxide, iron oxide, titanium oxide, aluminosilicate, kaolin, barium sulfate, and the like.

In the present invention, it is preferable to use a dispersion auxiliary agent together with the dispersant, for the purpose of improving dispersibility. Examples of such a dispersion auxiliary agent encompass sodium dodecylbenzenesulfonate, sodium alkanesulfonate, sodium alkylsulfonate, sodium alkyl diphenyl ether disulfonate, and sodium alpha olefin sulfonate. Out of these, a combination of tribasic calcium phosphate and sodium alkylsulfonate is preferable as a combination of an inorganic dispersant and a dispersion auxiliary agent.

The amounts of the inorganic dispersant and the dispersion auxiliary agent that are used vary according to their types and the type and amount of the polypropylene resin that is used. Generally, it is preferable to use the inorganic dispersant together with the dispersion auxiliary agent in an amount of not less than 0.2 parts by weight but not more than 3 parts by weight and in an amount of not less than 0.001 parts by weight but not more than 0.1 part by weight, respectively, to 100 parts by weight of water. Further, generally, it is preferable to use the polypropylene resin particles in an amount of not less than 20 parts by weight but not more than 100 parts by weight to 100 parts by weight of water so that the dispersibility of the polypropylene resin particles in the water is satisfactory.

In such a production method, the polypropylene resin particles may be united closely to each other (a plurality of particles adhere to each other) within the pressure-resistant container, depending on the temperature inside the pressure-resistant container or the amount of the inorganic dispersant etc. If this is the case, not all of the polypropylene resin particles are released during the foaming, and some of them may remain in the pressure-resistant container. Further, the polypropylene resin pre-foamed particles to be obtained may be closely united to each other. If the polypropylene resin particles remain in the pressure-resistant container, production efficiency will be reduced. Further, the polypropylene resin pre-foamed particles closely united to each other may cause defect during the subsequent in-mold foaming molding. In this regard, the present invention uses polypropylene resin in which an amount of components eluted at a temperature of not more than 40° C. in cross fractionation chromatography is not more than 2.0% by weight. Therefore, the polypropylene resin particles are less likely to be united closely to each other.

In a case where the amount of components eluted at the temperature of not more than 40° C. in cross fractionation chromatography is not more than 2.0% by weight, (i) the polypropylene resin should have a sharp resin composition distribution and (ii) a ratio of composition that causes the polypropylene resin particles to be closely united to each other within the pressure-resistant container should decrease. It is estimated that this reduces the likelihood that the polypropylene resin particles are closely united to each other within the pressure-resistant container.

The foaming ratio of the polypropylene resin pre-foamed particles of the present invention is preferably not less than 3 times but not more than 50 times, and more preferably not less than 7 times but not more than 45 times. Further, the polypropylene resin pre-foamed particles can be prepared in the following manner. First, pre-foamed particles (hereinafter may be referred to as first-stage pre-foamed particles) whose foaming ratio is preferably not less than 3 times but not more than 35 times are produced by (i) introducing, into a pressure-resistant container, a dispersion liquid containing polypropylene resin particles, a foaming agent, water, and an inorganic dispersant, (ii) raising a temperature of the dispersion liquid to a predetermined temperature, (iii) raising, under pressure, the temperature of a mixture in the container to a temperature of preferably not less than 20° C. below a melting point of the polypropylene resin but not more than 10° C. above the melting point of the polypropylene resin so as to impregnate the polypropylene resin particles with the foaming agent, and (iv) while maintaining the temperature and pressure inside the container constant, releasing, under pressure, the mixture from the container into a low-pressure atmosphere whose pressure is lower than pressure inside the container (this process may be referred to as first-stage foaming). Then, polypropylene resin pre-foamed particles (hereinafter may be referred to as two-stage pre-foamed particles) having an foaming ratio higher than that of the first-stage pre-foamed particles are produced by (a) introducing the first-stage pre-foamed particles into a pressure-resistance sealed container, (b) raising a pressure inside the first-stage pre-foamed particles to a pressure higher than a normal pressure by pressurizing the first-stage pre-foamed particles so as to impregnate the first-stage pre-foamed particles with nitrogen or air etc. at not less than 0.1 MPa but not more than 0.6 MPa (gage pressure), and thereafter (c) heating the first-stage pre-foamed particles by steam heating etc. so as to further foam the first-stage pre-foamed particles.

Also in a case of preparation of the second-stage pre-foamed particles, pre-foamed particles after the second-stage foaming may be united closely to each other depending on a heat condition. In this regard, the present invention uses polypropylene resin in which an amount of components eluted at a temperature of not more than 40° C. in cross fractionation chromatography is not more than 2.0% by weight. Therefore, the polypropylene resin particles are less likely to be united closely to each other.

In a case where the amount of components eluted at the temperature of not more than 40° C. in cross fractionation chromatography is not more than 2.0% by weight, (i) the polypropylene resin should have a sharp resin composition distribution and (ii) a ratio of composition that causes the polypropylene resin pre-foamed particles to be closely united to each other during the second-stage foaming should decrease. It is estimated that this reduces the likelihood that the polypropylene resin pre-foamed particles are closely united to each other during the second-stage foaming.

Note here that, a foaming ratio of the polypropylene resin pre-foamed particles is found by the following equation, by using a weight w (g) of the polypropylene resin pre-foamed particles, an ethanol submergence volume v (cm$^3$), and a density d (g/cm$^3$) of polypropylene resin that has not yet been foamed:

Foaming ratio=$d \times v/w$

An amount of the inorganic dispersant adhered to surfaces of the polypropylene resin pre-foamed particles of the present invention is preferably not more than 2000 ppm, more preferably not more than 1300 ppm, and most preferably not more than 800 ppm. The polypropylene resin in-mold foaming molded product tends to have good dimensional stability at high temperatures as long as the amount of the inorganic dispersant adhered to the surfaces of the polypropylene resin pre-foamed particles falls within the above range. If the amount of the inorganic dispersant adhered to the surfaces of the polypropylene resin pre-foamed particles is more than 2000 ppm, then fusibility during in-mold foaming molding tends to decrease. As a result, the polypropylene resin in-mold foaming molded product tends to have reduced dimensional stability at high temperatures.

The amount of an adhered inorganic dispersant of the present invention can be determined (i) by various spectroscopic analyses or (ii) quantity of ash obtained when the polypropylene resin pre-foamed particles are burned. For example, assume that the inorganic dispersant used is phosphate. W (g) of dried pre-foamed particles and 50.0 mL of aqueous solution (colorimetric liquid) containing 0.022% by weight of ammonium metavanadate, 0.54% by weight of ammonium molybdate, and 3% by weight of a nitric acid are introduced into a conical beaker, and are stirred for 1 minute and then allowed to stand for next 10 minutes. A resultant liquid phase is put into a quartz cell whose optical path length is 1.0 cm, and optical density A(–) of the liquid phase at 410 nm is measured with a spectrophotometer. Then, it is possible to find the amount of the phosphate from optical density of a normal phosphate solution.

In the polypropylene resin pre-foamed particles of the present invention, a ratio $Qh/(Ql+Qh) \times 100$ (hereinafter referred to as a DSC ratio) of a melting peak on a higher-temperature side, which is found from quantity of heat Ql at a melting peak on a lower-temperature side and quantity of heat Qh at a melting peak on a higher-temperature side, is preferably not less than 10% but not more than 50%, and more preferably not less than 15% but not more than 40%. See FIG. 1 for the DSC ratio. A DSC curve obtained by raising a temperature of the polypropylene resin pre-foamed particles from 40° C. to 200° C. at a heating rate of 10° C./min in differential scanning calorimetry shows two melting peaks, one of which is the melting peak on the lower-temperature side and the other one of which is the melting peak on the higher-temperature side. The quantity of heat Ql at the melting peak on the lower-temperature side is quantity of heat enclosed by (i) the melting peak on the lower-temperature side and (ii) a tangent, to the DSC curve, which extends from a maximum point between the melting peak on the lower-temperature side and the melting peak on the higher-temperature side to a base line from which melting starts. The quantity of heat Qh at the melting peak on the higher-temperature side is quantity of heat enclosed by (a) the melting peak on the higher-temperature side and (b) a tangent, to the DSC curve, which extends from the maximum point between the melting peak on the lower-temperature side and the melting peak on the higher-temperature side to a base line at which the melting ends. With the DSC ratio falling within the above range, it is easy to obtain a polypropylene resin in-mold foaming molded product that is excellent in beauty of a surface. If the DSC ratio is less than 10%, the polypropylene resin pre-foamed particles tend to have open cells. If the DSC ratio is more than 50%, there is a tendency for fusibility to decrease during production of an in-mold foaming molded product.

The quantity of heat Qh at the melting peak on the higher-temperature side is not limited; however, is preferably not less than 4 J/g but not more than 28 J/g, more preferably not less than 7 J/g but not more than 25 J/g, and most preferably not less than 10 J/g but not more than 22 J/g. If the quantity of heat Qh at the melting peak on the higher-temperature side is less than 4 J/g, the polypropylene resin pre-foamed particles are likely to have open cells. If the quantity of heat Qh at the melting peak on the higher-temperature side is more than 28 J/g, it tends to be difficult for the foaming ratio to become high.

The polypropylene resin pre-foamed particles of the present invention can be made into a polypropylene resin in-mold foaming molded product by a known conventional method such as (A) a method of subjecting the polypropylene resin pre-foamed particles directly to in-mold foaming molding, (B) a method of pressing an inorganic gas such as air into the polypropylene resin pre-foamed particles in advance so as to impart internal pressure (foaming capacity), and then subjecting the polypropylene resin pre-foamed particles to in-mold foaming molding, or (C) a method of filling a mold with the polypropylene resin pre-foamed particles so that the polypropylene resin pre-foamed particles are in a compressed state, and then subjecting the polypropylene resin pre-foamed particles to in-mold foaming molding.

A specific example of a method of preparing a polypropylene resin in-mold foaming molded product from the polypropylene resin pre-foamed particles of the present invention is for example a method of (i) pressurizing, with air, the polypropylene resin pre-foamed particles within a pressure-resistant container in advance, i.e., impregnating air into the polypropylene resin pre-foamed particles so as to impart internal pressure (foaming capacity), (ii) filling, with the polypropylene resin pre-foamed particles, a mold space that is composed of two molds and can close but cannot be sealed, (iii) molding the polypropylene resin pre-foamed particles with a heat medium such as steam at a heat water vapor pressure of approximately not less than 0.1 MPa but not more than 0.4 Mpa (gage pressure) for approximately not less than 3 seconds but not more than 30 seconds so that the polypropylene resin pre-foamed particles are fusion bonded to each other, (iv) cooling the molds with water to the extent that deformation of the polypropylene resin in-mold foaming molded product after being taken out of the molds can be prevented, and then (v) opening the molds.

The internal pressure of the polypropylene resin pre-foamed particles can be controlled by for example pressurizing, with an inorganic gas such as air or a nitrogen gas, the polypropylene resin pre-foamed particles inside a pressure-resistant container for not less than 1 hour but not more than 48 hours at a temperature of not less than a room temperature but not more than 80° C. so that the pressure inside the pressure-resistant container is not less than 0.1 MPa but not more than 1.0 MPa (gage pressure).

The polypropylene resin in-mold foaming molded product thus prepared from the polypropylene resin pre-foamed particles of the present invention preferably has a density of not less than 10 kg/m$^3$ but not more than 300 kg/m$^3$, and more preferably not less than 15 kg/m$^3$ but not more than 250 kg/m$^3$. If the density is less than 10 kg/m$^3$, the polypropylene resin in-mold foaming molded product tends to have reduced mechanical properties such as compressive strength. If the density is more than 300 kg/m$^3$, the polypropylene resin in-mold foaming molded product tends to have a reduced buffering capacity.

EXAMPLES

The following description discusses in detail the present invention with examples. Note, however, that the present invention is not limited to these examples.

[Measurement with Cross Fractionation Chromatograph]

An amount of components eluted at a temperature of not more than 40° C. was measured with use of Cross Fractionation Chromatograph CFC T-150A, manufactured by Mitsubishi Petrochemical Co., Ltd., under the following condition:

Detector: Infrared Spectrophotometer, Model 1ACVF, manufactured by Miran
Detection wavelength: 3.42 μm
GPC column: Three columns, each of which is Shodex AT-806MS, manufactured by SHOWA DENKO K.K.
Column temperature: 135° C.
Column calibration: Monodisperse polystyrene, manufactured by TOSOH CORPORATION
Molecular weight calibration method: General calibration method/based on polyethylene
Eluent: o-dichlorobenzene (ODCB)
Flow rate: 1.0 mL/min
Sample concentration: 30 mg/10 mL
Injection volume: 500 μL
Temperature-lowering period: 135 minutes (0° C. from 135), temperature is maintained for next 60 minutes
Elution fraction: 0° C., 20° C., 40° C., 50° C., 60° C., 70° C., 75° C., 80° C., 83° C., 86° C., 89° C., 92° C., 95° C., 98° C., 101° C., 104° C., 106° C., 108° C., 110° C., 112° C., 114° C., 116° C., 118° C., 120° C., 122° C., 124° C., 126° C., 130° C., 135° C. (29 fractions)

[Measurement of Melting Point]

A melting point was found with use of a differential scanning calorimeter, Model DSC6200, which is manufactured by Seiko Instruments Inc. The melting point thus found is a temperature at a melting peak in a second temperature rise on a DSC curve, which is obtained by raising a temperature of 5 mg to 6 mg of polypropylene resin from 40° C. to 220° C. at a heating rate of 10° C./min so as to melt resin particles, lowering the temperature from 220° C. to 40° C. at a cooling rate of 10° C./min so as to crystallize the resin particles, and then again raising the temperature from 40° C. to 220° C. at a heating rate of 10° C./min.

[Production Efficiency]

After foaming, residual polypropylene resin in a pressure-resistant container and resultant polypropylene resin pre-foamed particles were observed to evaluate production efficiency of the polypropylene resin pre-foamed particles with the following indices:

Good: There is no residual polypropylene resin in the pressure-resistant container, and the resultant polypropylene resin pre-foamed particles are not united closely to each other.

Poor: There is residual polypropylene resin in the pressure-resistant container or the resultant polypropylene resin pre-foamed particles are united closely to each other.

[Measurement of DSC Ratio]

A ratio (Qh/(Ql+Qh)×100) of a melting peak on a higher-temperature side, which is found from quantity of heat Ql at a melting peak on a lower-temperature side and quantity of heat Qh at a melting peak on a higher-temperature side, was calculated with use of a differential scanning calorimeter, Model DSC6200, which is manufactured by Seiko Instruments Inc. The quantity of heat Ql at the melting peak on the lower-temperature side and the quantity of heat Qh at the melting peak at the higher-temperature side are of two melting peaks on a DSC curve, which is obtained by raising the temperature of 5 mg to 6 mg of the polypropylene resin pre-foamed particles from 40° C. to 200° C. at a heating rate of 10° C./min. The quantity of heat Ql at the melting peak on the lower-temperature side is quantity of heat enclosed by (i) the melting peak on the lower-temperature side and (ii) a tangent, to the DSC curve, which extends from a maximum point between the melting peak on the lower-temperature side and the melting peak on the higher-temperature side to a base line from which melting starts. The quantity of heat Qh at the melting peak on the higher-temperature side is quantity of heat enclosed by (a) the melting peak at the higher-temperature side and (b) a tangent, to the DSC curve, which extends from the maximum point between the melting peak on the lower-temperature side and the melting peak on the higher-temperature side to a base line at which the melting ends.

[Foaming Ratio of Polypropylene Resin Pre-Foamed Particles]

First, a weight w (g) of the polypropylene resin pre-foamed particles having a bulk volume of approximately 50 cm$^3$ was measured. Next, an increased volume (submergence volume) v (cm$^3$) obtained when the polypropylene resin pre-foamed particles were immersed in ethanol was found. Then, a foaming ratio was found by the following equation by using a density d (g/cm³) of the polypropylene resin that had not yet been foamed:

Foaming ratio=d×v/w

[Measurement of Amount of Adhered Inorganic Dispersant (Case where Inorganic Dispersant is Calcium Phosphate)

W (g) of dried pre-foamed particles and 50.0 mL of aqueous solution (colorimetric liquid) containing 0.022% by weight of ammonium metavanadate, 0.54% by weight of ammonium molybdate, and 3% by weight of a nitric acid were introduced into a conical beaker, and were stirred for 1 minute and then allowed to stand for next 10 minutes. A resultant liquid phase was put in a quartz cell whose optical path length was 1.0 cm, and optical density A(-) of the liquid phase at 410 nm was measured with a spectrophotometer.

For a colorimetric liquid identical to that used above, coefficient $\epsilon$(g/L·cm) of optical density at 410 nm of adhered tribasic calcium phosphate is measured beforehand. An amount C of adhered tribasic calcium phosphate is calculated by an equation of C (ppm)=$5.0\times10^4 \cdot \epsilon \cdot A/W$.

[Evaluation of Fusion Ratio]

First, each of polypropylene resin in-mold foaming molded products obtained by carrying out molding at various molding heating steam pressures was cut with a knife so that a crack of approximately 3 mm was made in a thickness direction of the each of the polypropylene resin in-mold foaming molded products. Next, the each of the polypropylene resin in-mold foaming molded products was split by hands along the crack. Then, a section of each of split polypropylene resin in-mold foaming molded products was observed so as to find a ratio of the number of broken polypropylene resin pre-foamed particles to the number of polypropylene resin pre-foamed particles constituting the section. The ratio serves a fusion ratio.

[Density of Molded Product]

A length, width, and thickness of an obtained polypropylene resin in-mold foaming molded product having a shape of a rectangular parallelepiped were measured. Further, a weight of the polypropylene resin in-mold foaming molded product was measured. Then, a density of the molded product was calculated by dividing the weight by volume of the in-mold foaming molded product.

[Dimensional Stability at High Temperatures (Rate of Change in Dimension at High Temperatures)]

A test piece of 180 mm in length×40 mm in width×19 mm in thickness was cut out from an obtained polypropylene resin in-mold foaming molded product, and its length, width, and thickness were accurately measured with use of a slide gage. Next, the test piece was subjected to heat treatment in an oven at 110° C. or 90° C. for 22 hours, and allowed to stand for 3 hours under 23° C. atmosphere. Then, the length, width, and thickness of the test piece were again accurately measured with use of the slide gage.

A rate of change in dimension at high temperatures was calculated for each of a length direction, width direction, and thickness direction by the following equation:

Rate of change in dimension at high temperatures= {(Dimension before heating−Dimension after heating)/Dimension before heating}×100(%)

Example 1

0.5 parts by weight of polyethylene glycol (PEG#300, manufactured by Lion Corporation) serving as a cell core-forming agent, 0.1 parts by weight of talc (PKS, manufactured by Hayashi-Kasei Co., Ltd), and 0.05 parts by weight of 1,3,5-tris(3,5-di-t-butyl-4-hydroxybenzyl) isocyanurate were blended into 100 parts by weight of propylene-ethylene random copolymer resin which had a melting point of 137° C. and in which an amount of components eluted at a temperature of not more than 40° C. in cross fractionation chromatography was 0% by weight. Next, the mixture was melted and kneaded in a single screw extruder 50 mm in diameter (Model 20VSE-50-28, manufactured by Osaka Seiki Kosaku Co., Ltd.). Melted and kneaded resin thus obtained was extruded through a circular die so as to be in a form of strand, cooled with water, and then cut with a pelletizer to give polypropylene resin particles (1.2 mg/particle).

100 parts by weight of polypropylene resin particles thus obtained, 200 parts by weight of water, 1.0 parts by weight of tribasic calcium phosphate serving as a dispersant, and 0.05 parts by weight of sodium alkylsulfonate serving as a dispersion auxiliary agent were fed into a pressure-resistant autoclave (capacity: 10 L). Then, 6.25 parts by weight of a carbon dioxide gas serving as a foaming agent was added while stirring. A temperature of the mixture in the autoclave was raised to a foaming temperature of 141° C., and then a carbon dioxide gas was further added to control internal pressure of the autoclave to be 3.0 MPa (gage pressure). Then, the pressure was maintained for 30 minutes. Thereafter, the mixture in the autoclave was released into atmospheric pressure through an orifice 4 mm in diameter by opening a valve installed in a lower part of the autoclave, thus giving first-stage pre-foamed particles. The first-stage pre-foamed particles thus obtained had a foaming ratio of 15 times and a DSC ratio of melting point peak of 18%. An internal pressure of 0.32 MPa (absolute pressure) was imparted to the first-stage pre-foamed particles by impregnation with air, and the first-stage pre-foamed particles were heated with steam at 0.11 MPa (gage pressure) to give pre-foamed particles having a foaming ratio of approximately 30 times.

Polypropylene resin pre-foamed particles thus obtained were washed with a hydrochloric acid aqueous solution (pH=1) and then dried at 75° C. Then, an amount of adhered inorganic dispersant was measured.

Next, a polypropylene resin in-mold foaming molded product was obtained, with use of a polyolefin foam molding machine KD-345 (manufactured by DAISEN Co., Ltd.), by (i) filling a mold of 300 mm in length×400 mm in width×21 mm in thickness with the polypropylene resin pre-foamed particles that had been controlled in advance to have an internal air pressure of 0.20 MPa (absolute pressure) and (ii) compressing the polypropylene resin pre-foamed particles by 5% in a thickness direction to carry out heat molding. Note here that polypropylene resin in-mold foaming molded products were obtained through molding at various molding heating steam pressures. Each of the polypropylene resin in-mold foaming molded products thus obtained was allowed to stand for 1 hour at a room temperature, dried and cured for 3 hours in a temperature-controlled room at 75° C., again taken out to a room temperature, and then allowed to stand for 1 hour. Then, a density of the molded product was measured and a fusion ratio of the molded product was evaluated to find a molding heating steam pressure at which a fusion ratio becomes 60% (such a pressure is referred to as 60% fusion mold pressure). Further, an in-mold foaming molded product molded at the lowest molding heating steam pressure was selected from in-mold foaming molded products each having a fusion ratio of 95% or higher, and its dimensional stability (rate of change in dimension at high temperatures) at 110° C. was evaluated. The result of evaluation is shown in Table 1.

TABLE 1

|  |  | Example 1 | Example 2 | Example 3 | Comparative Example 1 | Comparative Example 2 | Comparative Example 3 |
|---|---|---|---|---|---|---|---|
| Base resin | Polymerization catalyst | Metallocene type*1 | Metallocene type*1 | Metallocene type*1 | Ziegler type | Ziegler type | Metallocene type*2 |
|  | Type of comonomer | Ethylene | Ethylene | Ethylene | Ethylene | Ethylene, 1-Butene | Ethylene |
|  | Content of comonomer (mol %) | 2.3 | 3.4 | 2.0 | 2.3 | 4.1 | 5.8 |
|  | Melting point (° C.) | 137 | 126 | 118 | 137 | 132 | 118 |
|  | Amount of components eluted in CFC (wt %) | 0 | 0.2 | 0.4 | 7.5 | 4.3 | 2.9 |
|  | Amount of 2,1-insertion + 1,3-insertion (mol %) | <0.5 | <0.5 | <0.5 | <0.5 | <0.5 | 0.9 |
|  | MFR (g/10 min.) | 16.1 | 18.0 | 5.0 | 5.7 | 5.3 | 7.9 |
| Pre-foamed particles | Foaming agent | $CO_2$ | $CO_2$ | $CO_2$ | $CO_2$ | $CO_2$ | $CO_2$ |
|  | Foaming temperature (° C.) | 141 | 129 | 119 | 141 | 135 | 119 |
|  | Production efficiency | Good | Good | Good | Poor | Poor | Poor |
|  | Foaming ratio (times) | 30 | 30 | 30 | 30 | 30 | 30 |
|  | DSC ratio (%) | 18 | 18 | 18 | 18 | 18 | 18 |
|  | Qh (J/g) | 10 | 8 | 6 | 10 | 11 | 6 |
|  | Amount of adhered inorganic dispersant (ppm) | 70 | 70 | 70 | 70 | 70 | 70 |
| In-mold foaming molded product | 60% fusion mold pressure (MPa)*3 | 0.18 | 0.11 | 0.10 | 0.19 | 0.15 | 0.12 |
|  | Density of molded product (kg/m³) | 20 | 20 | 20 | 20 | 20 | 20 |
|  | Rate of change in dimension at high temperatures Length (%) | 2 (110° C.) | 4 (110° C.) | 2 (90° C.) | 4 (110° C.) | 4 (110° C.) | 3 (90° C.) |
|  | Rate of change in dimension at high temperatures Width (%) | 2 (110° C.) | 5 (110° C.) | 2 (90° C.) | 4 (110° C.) | 5 (110° C.) | 4 (90° C.) |
|  | Rate of change in dimension at high temperatures Thickness (%) | 1 (110° C.) | 4 (110° C.) | 1 (90° C.) | 3 (110° C.) | 4 (110° C.) | 2 (90° C.) |

*1Metallocenecatalyst containing diphenylmethylene (3-tert-butyl-5-methyl-cyclopentadienyl) (2,7-ditert-butylfluorenyl) zirconiumdichloride
*2Metallocenecatalyst containing dimethylsilylenebis (2-methyl-4-phenylindenyl) zirconiumdichloride
*3Gage pressure

Example 2

Polypropylene resin pre-foamed particles and a polypropylene resin in-mold foaming molded product were obtained in the same way as in Example 1, except that the amount of components eluted at the temperature of not more than 40° C. in cross fractionation chromatography was 0.2% by weight, the propylene-ethylene random copolymer resin had a melting point of 126° C., and the conditions were as shown in Table 1. Further, evaluation was carried out in the same way as in Example 1. The results are shown in Table 1.

Example 3

Polypropylene resin pre-foamed particles and a polypropylene resin in-mold foaming molded product were obtained in the same way as in Example 1, except that the amount of components eluted at the temperature of not more than 40° C. in cross fractionation chromatography was 0.4% by weight, the propylene-ethylene random copolymer resin had a melting point of 118° C., and the conditions were as shown in Table 1. Evaluation was carried out in the same way as in Example 1, except that evaluation of a rate of change in dimension at high temperatures was carried out at 90° C. The results are shown in Table 1.

Comparative Example 1

Polypropylene resin pre-foamed particles and a polypropylene resin in-mold foaming molded product were obtained in the same way as in Example 1, except that the amount of components eluted at the temperature of not more than 40° C. in cross fractionation chromatography was 7.5% by weight, the propylene-ethylene random copolymer resin had a melting point of 137° C., and the conditions were as shown in Table 1. Further, evaluation was carried out in the same way as in Example 1. The results are shown in Table 1.

Comparative Example 2

Polypropylene resin pre-foamed particles and a polypropylene resin in-mold foaming molded product were obtained in the same way as in Example 1, except that the amount of components eluted at the temperature of not more than 40° C. in cross fractionation chromatography was 4.3% by weight, propylene-ethylene-1-butene random copolymer resin having a melting point of 132° C. was used, and the conditions were as shown in Table 1. Further, evaluation was carried out in the same way as in Example 1. The results are shown in Table 1.

Comparative Example 3

Polypropylene resin pre-foamed particles and a polypropylene resin in-mold foaming molded product were obtained in the same way as in Example 1, except that the amount of components eluted at the temperature of not more than 40° C. in cross fractionation chromatography was 2.9% by weight, the propylene-ethylene random copolymer resin had a melting point of 118° C., and the conditions were as shown in Table 1. Evaluation was carried out in the same way as in Example 1, except that evaluation of a rate of change in dimension at high temperatures was carried out at 90° C. The results are shown in Table 1.

Comparison between Example 1 and Comparative Example 1 shows that, although the propylene-ethylene random copolymer resin having an identical melting point is used both in Example 1 and Comparative Example 1, the polypropylene resin in-mold foaming molded product of Example 1 has a low rate of change in dimension at high temperatures and is excellent in dimensional stability at high temperatures.

Comparison between Example 2 and Comparative Example 2 shows that, although the propylene-ethylene random copolymer resin used in Example 2 has a low melting point, the polypropylene resin in-mold foaming molded products of both of them show an identical rate of change in dimension at high temperatures. That is, it is shown that the polypropylene resin in-mold foaming molded product of Example 2 exhibits good dimensional stability at high temperatures in spite of its low melting point. Further, the 60% fusion mold pressure shows that the polypropylene resin in-mold foaming molded product of Example 2 can be molded at a low molding heating steam pressure.

In Example 3 and Comparative Example 3, dimensional stability at high temperatures was evaluated at 90° C., because the melting point of resin was low. It is shown that, although the propylene-ethylene random copolymer resin having an identical melting point is used both in Example 3 and Comparative Example 3, the polypropylene resin in-mold foaming molded product of Example 3 has a low rate of change in dimension at high temperatures and is excellent in dimensional stability at high temperatures.

INDUSTRIAL APPLICABILITY

Polypropylene resin pre-foamed particles of the present invention can be molded at a not high molding heating steam pressure in in-mold foaming molding, and a propylene resin in-mold foaming molded product prepared from the polypropylene resin pre-foamed particles of the present invention is excellent in dimensional stability at high temperatures. Therefore, the polypropylene resin pre-foamed particles of the present invention are suitably applicable to an automobile interior part, a core material for an automobile bumper, a heat insulating material, a buffering packaging material, a returnable box, or the like.

The invention claimed is:

1. Polypropylene resin pre-foamed particles comprising, as base resin, polypropylene resin that satisfies the following requirements (a) through (c):
   (a) in cross fractionation chromatography, an amount of components eluted at a temperature of not more than 40° C. is not more than 2.0% by weight;
   (b) a melting point is not less than 100° C. but not more than 160° C.; and
   (c) propylene monomer units are present in an amount of not less than 90 mol % but not more than 100 mol %, and olefin units each having a carbon number of 2 or 4 or more are present in an amount of not less than 0 mol % but not more than 10 mol %.

2. The polypropylene resin pre-foamed particles according to claim 1, wherein, in the polypropylene resin, the amount of components eluted at the temperature of not more than 40° C. in cross fractionation chromatography is not more than 0.5% by weight.

3. The polypropylene resin pre-foamed particles according to claim 1, wherein the polypropylene resin has been polymerized by using a metallocene catalyst.

4. The polypropylene resin foamed particles according to claim 3, wherein the metallocene catalyst contains a metallocene compound having a structure in which transition metal is sandwiched between different types of pi unsaturated cyclic compounds.

5. The polypropylene resin foamed particles according to claim 4, wherein the metallocene catalyst contains a metallocene compound represented by a general formula [I]:

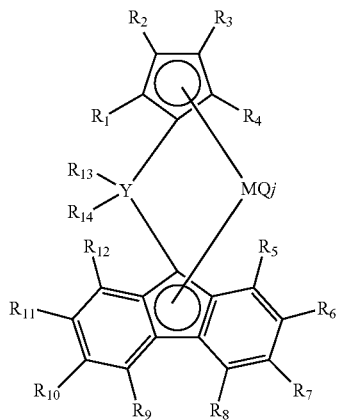

wherein, $R^1$, $R^2$, $R^3$, $R^4$, $R^5$, $R^6$, $R^7$, $R^8$, $R^9$, $R^{10}$, $R^{11}$, $R^{12}$, $R^{13}$, and $R^{14}$ are identical with each other or are different from each other and are each selected from a hydrogen atom, a hydrocarbon group, and a silicon-containing group; M represents group-4 transition metal; Y represents a carbon atom or a silicon atom; Qs are identical with each other or are different from each other and are each selected from a halogen atom, a hydrocarbon group, an anion ligand, and a neutral ligand capable of coordination by a lone pair of electrons; and j is an integer of 1 to 4.

6. The polypropylene resin pre-foamed particles according to claim 1, wherein the melting point of the polypropylene resin is not less than 110° C. but not more than 145° C.

7. The polypropylene resin pre-foamed particles according to claim 1, wherein, in the polypropylene resin, a total amount of regio-irregular propylene monomer units based on 2,1-insertion and 1,3-insertion relative to overall propylene insertion as determined by $^{13}$C-NMR is less than 0.5 mol %.

8. Polypropylene resin pre-foamed particles according to any claim 1, further comprising a phenolic antioxidant in an amount of not less than 0.005 parts by weight but not more than 0.5 parts by weight to 100 parts by weight of the polypropylene resin.

9. The polypropylene resin pre-foamed particles according to claim 1, wherein:
   two melting peaks, which are a first melting peak on a lower-temperature side and a second melting peak on a higher-temperature side, are observed in differential scanning calorimetry; and
   a ratio Qh/(Ql+Qh)×100 of the second melting peak is not less than 10% but not more than 50%, the ratio being calculated from quantity of heat Ql at the first melting peak and quantity of heat Qh at the second melting peak.

10. A polypropylene resin in-mold foaming molded product prepared from polypropylene resin pre-foamed particles recited in claim 1, the polypropylene resin in-mold foaming molded product having a density of not less than 10 kg/m³ but not more than 300 kg/m³.

11. A method for producing polypropylene resin pre-foamed particles, comprising the steps of:
   introducing polypropylene resin particles satisfying the following requirements (a) through (c), water, and an inorganic dispersant into a pressure-resistant container;
   dispersing the polypropylene resin particles while stirring;
   raising a temperature of a dispersion liquid to a temperature higher or equal to a softening point of the polypropylene resin particles under existence of a foaming agent; and releasing the dispersion liquid from the pressure-resistant container into a zone whose pressure is lower than an internal pressure of the pressure-resistant container so as to foam the polypropylene resin particles:

(a) in cross fractionation chromatography, an amount of components eluted at a temperature of not more than 40° C. is not more than 2.0% by weight;

(b) a melting point is not less than 100° C. but not more than 160° C.; and (c) propylene monomer units are present in an amount of not less than 90 mol % but not more than 100 mol %, and olefin units each having a carbon number of 2 or 4 or more are present in an amount of not less than 0 mol % but not more than 10 mol %.

* * * * *